United States Patent [19]

Bauer et al.

[11] Patent Number: 4,524,182
[45] Date of Patent: Jun. 18, 1985

[54] USE OF CROSS-LINKED EPOXIDIZED FATTY OILS IN VULCANIZING POLYMERS

[75] Inventors: Armin Bauer, Bruehl; Helfried Ehrend, Speyer; Klaus Morche, Mannheim; Karl Nützel, Neulussheim; Michael Sauerbier, Bruehl-Rohrhof, all of Fed. Rep. of Germany

[73] Assignee: Rhein-Chemie Rhein GmbH, Mannheim, Fed. Rep. of Germany

[21] Appl. No.: 581,878

[22] Filed: Feb. 21, 1984

[30] Foreign Application Priority Data

Mar. 3, 1983 [DE] Fed. Rep. of Germany ....... 3307421

[51] Int. Cl.$^3$ .................. C08G 59/20; C10M 3/20; C08K 5/11
[52] U.S. Cl. .................. 525/120; 525/107; 528/365; 528/491
[58] Field of Search .............. 525/111.5, 107, 120; 528/365, 491

[56] References Cited

U.S. PATENT DOCUMENTS

| | | | |
|---|---|---|---|
| 2,700,030 | 1/1955 | Widmer et al. | 525/510 |
| 2,910,455 | 10/1959 | Christenson et al. | 528/101 |
| 3,065,195 | 11/1962 | Vasta | 525/110 |
| 3,070,564 | 12/1962 | Roeser | 525/383 |
| 3,089,863 | 5/1963 | Hicks et al. | 525/31 |
| 3,215,757 | 11/1965 | Scheibli et al. | 525/120 |
| 3,793,398 | 2/1974 | Hokamura | 525/31 |

Primary Examiner—Herbert S. Cockeram
Attorney, Agent, or Firm—Connolly and Hutz

[57] ABSTRACT

Epoxidized and subsequently cross-linked esters of alcohols which are at least dihydric and unsaturated fatty acids may be used as active processing substance in polymers, in particular elastomers, at higher temperatures, in particular at higher vulcanization temperatures, than "Factice". They may be produced by a particularly elegant one-shot reaction.

6 Claims, No Drawings

USE OF CROSS-LINKED EPOXIDIZED FATTY OILS IN VULCANIZING POLYMERS

High molecular weight substances, such as elastomers, thermoplasts and duromers, are mixed with a wide variety of additives, such as antioxidants, light protective agents, stabilizers, processing auxiliaries, lubricants, plasticizers, flame retarding agents, antistatic agents, pigments or suitable selections thereof.

It has been possible in the course of development, to find a large number of active substances which are able to fulfil more than one requirement of an auxiliary. Thus, many lubricants function both as "internal" and as "external" lubricants in that they both lower the viscosity of the elastomer or polymer during processing and facilitate removal of the finished article from a mould by forming a film of lubricant on its surface.

One additive which is preferentially used in elastomers and serves primarily as processing auxiliary is "Factice". Factice is a vulcanised polymerisation product of unsaturated vegetable, optionally also animal, fatty oils, such as rapeseed oil, linseed oil, soya bean oil or fish oil. The fatty oils are reacted either with from 5 to 20% by weight of sulphur at from 120° to 170° C. or with sulphuryl dichloride at from 20° to 70° C.

Cross-linked, relatively high molecular weight, elastic substances which may readily be crushed or ground are obtained in both cases due to the formation of intramolecular and intermolecular sulphur bridges.

Factice is used in rubber technology as processing auxiliary having a wide range of important properties. Thus, it has filler dispersing and plasticizing properties for the production of rubber mixtures and improves the processing of such mixtures in the extruder. In addition, the dimensional stability and stability under load found in unvulcanized sections containing Factice, even at the temperatures prevailing during vulcanization, are extremely valuable properties for the fabrication of complicated rubber parts.

One disadvantage is that the use of Factice diminishes the tensile strength and tension values of the vulcanizates to an extent depending upon the amount of Factice added.

Another disadvantage of Factice is its low temperature resistance, 160°–190° C., which is due to its sulphur bridges and which, in view of the unmistakable trend towards the use of higher vulcanization temperatures, diminishes its possible range of applications since the Factice decomposes under these conditions and the oily decomposition products contaminate the rubber surfaces, as for example, the salt baths in which vulcanization is carried out. The decomposition products, moreover, constitute a fire risk.

There has been no lack of attempts to overcome the above-mentioned disadvantages of sulphur-cross-linked Factice by the development of suitable substitutes. Thus, it has been attempted to polymerise unsaturated or hydroxyl group-containing triglycerides by other means. For example, oxygen-cross-linked triglycerides have been obtained by the introduction of oxygen or air into heated fatty oils. The production of these Factice-like products is, however, not reproducible. Triglycerides containing OH groups, such as castor oil, have also been cross-linked with substances, such as $SiCl_4$, $PCl_3$ or $POCl_3$. The products obtained are, however, not resistant to hydrolysis, nor is the large quantity of hydrogen chloride formed simple to remove.

It has also been attempted to cross-link hydroxyl group-containing triglycerides, such as castor oil, with poly-functional isocyanates. The so-called "isocyanate-Factices" obtained were found to have insufficient thermal resistance and were therefore unsatisfactory at high vulcanization temperatures.

It was an object of the present invention to find Factice-like compounds which, when used in elastomers, would ensure the dimensional stability and stability under load of unvulcanized sections even at high vulcanization temperatures.

It has now been found that this problem may be solved by using epoxidized and subsequently cross-linked esters of at least dihydric, preferably at least trihydric, alcohols and unsaturated fatty acids, in particular the glycerides of such fatty acids.

The present invention therefore relates to the use of epoxidized and subsequently cross-linked esters of at least dihydric, preferably at least trihydric, alcohols and unsaturated fatty acids, in particular natural triglycerides of unsaturated fatty acids, as active processing auxiliaries in polymers, in particular in elastomers.

The epoxidized and subsequently cross-linked esters are obtained by first epoxidizing them and then cross-linking them with suitable polyfunctional cross-linking agents which are reactive with epoxide groups, such as polycarboxylic acids, polyamines, polyhydroxyl compounds or polythiol compounds. Succinic acid, phthalic acid, terephthalic and isophthalic acids and trimellitic acid are examples of suitable di- and higher poly-carboxylic acids. Examples of suitable polyamines include ethylene diamine, diethylene triamine, hexamethylene diamine and phenylene diamines. Examples of suitable polyhydroxyl compounds include glycerol, glycol, diglycol, pentaerythritol, hydroquinone, pyrogallol and hydroxycarboxylic acids esterifed with polyhydric alcohols. Suitable polythiol compounds are, for example, ethane-1,2-thiol, trimethylolpropane-tri-3-mercaptopropionate, pentaerythritol-tetra-3-mercaptopropionate and dithiophosphoric acids. Suitable cross-linking agents may also contain several functional groups in one molecule.

Suitable alcohols which are at least dihydric, preferably trihydric, are, for example, glycerol, glycol, pentaerythritol, trimethylol-propane and/or sorbitol. Among the esters, the natural triglycerides of unsaturated fatty acids, so-called "fatty oils", for example rapeseed oil, linseed oil, soya bean oil and fish oil, are preferred. When dihydric alcohols are used, the cross-linking agents are preferably at least trifunctional.

The cross-linking agents are reacted with the epoxidized fatty oils, which may have epoxide contents of from 1.5 to 15%, by weight, (percent, by weight, of oxygen based on the epoxidized fatty oil), preferably from 4 to 8%, by weight, generally in amounts of from 3 to 50% by weight, generally at temperatures of from 80° to 180° C., preferably from 100° to 150° C., the products obtained being solid or semi-solid polymers.

The quantity of cross-linking agent added is calculated to provide about one cross-linkable group of cross-linking agent per epoxide group.

If the reaction is not completely stoichiometric, the cross-linking product should preferably still contain epoxide groups.

Dicarboxylic acids are preferred cross-linking agents.

The cross-linked products are added to the polymers, in particular to the elastomers, generally in quantities of from 3 to 400%, by weight, based on the pure polymer.

A further object of the present invention is the production of the cross-linked products by a one-shot process, in which the fatty oils, after having been epoxidized with suitable per-acids, such as peracetic acid or performic acid, are dehydrated by the passage therethrough of a stream of gas, such as air or nitrogen, in the presence of from 0.5 to 5%, by weight, based on the quantity of ester, of basic oxides, such as calcium oxide, magnesium oxide, or other suitable acid-binding agents, at temperatures of from 100° to 120° C. It is surprisingly found that this may be directly followed by the reaction with polyfunctional cross-linking agents without a loss in the quality of the cross-linked products. The presence in the polymers of the basic oxides or the neutralization products thereof with the acids contained in the mixture in many cases does not interfere with the use of the polymers.

The liquid to solid polymers obtained have a more favourable thermal stability than sulphur-Factices or isocyanate-Factices. When used in rubber mixtures and rubber technical processes, they are surprisingly found to manifest similar properties to sulphur-Factice. In addition, the higher thermal resistance of the products according to the present invention is demonstrated by the fact that they show no signs of change in a salt bath even at 255° C.

The stability under load of unvulcanized semi-finished products or foils of rubber mixtures is higher when the products according to the present invention are used than that obtained with the use of sulphur-Factice. One characteristic which plays an important role in the quality of vulcanizates is the compression set. When the products according to the present invention are used in elastomers, the values obtained for the compression set are lower (more advantageous) than those of vulcanizates containing sulphur-Factice.

The above-mentioned, advantageous properties are also found when rubber is cross-linked with a peroxide because sulfur-containing products must be avoided on account of the odour.

When the products according to the present invention are introduced into PVC, foils heated to temperatures of about 200° C. are found to have a surprisingly high dimensional stability compared with foils which do not contain the products according to the present invention and the thermal stability is also found to be improved.

EXAMPLE 1

500 g of an epoxidized rapeseed oil having an epoxide content of 4.5%, by weight, are heated to 130° C. with stirring. 50 g of succinic acid are added portionwise in the course of 15 minutes. After 2 hours, the viscosity has risen to such an extent that the mixture is hardly stirrable. The mixture is then poured into a metal container and left to react in a heating cupboard for 24 hours at 130° C. The resulting mass is crushed and may be incorporated in this form in elastomers and polymers.

EXAMPLE 2

500 g of epoxidized soya bean oil having an epoxide content of 6% by weight, and 60 g of ethylene diamine are heated to 140° C. with stirring. The viscosity of the mixture has risen to such an extent after 1 hour that stirring is difficult. The mixture is poured into a suitable vessel and left to react in a heating cupboard at 140° C. for 18 hours. The resulting mass may easily be crushed or broken down and is incorporated in this form in elastomers or polymers.

EXAMPLE 3

4 kg of rapeseed oil are heated to 50° C. and a mixture of 950 g of 50% by weight hydrogen peroxide, 50 g of concentrated phosphoric acid and 250 g of formic acid, cooled to from 0° to 5° C., is added dropwise with stirring and cooling over 2 hours. After 5 hours, the reaction mixture is heated to 100° C. and nitrogen is passed through the reaction mixture to assist dehydration, during which time the temperature may be gradually raised to 120° C. 500 g of adipic acid are then added portion-wise at 130° C. in the course of 15 minutes. After 2 hours stirring at 130° C., the viscosity has risen so that the mixture is hardly stirrable. The mixture is poured into a metal container and left to react in a heating cupboard for 24 hours at 130° C. The resulting mass is crushed and may be incorporated in this form in elastomers and polymers.

TABLE 1

| | Test mixture (parts, by weight) | | |
|---|---|---|---|
| | 1 | 2 | 3 |
| SBR rubber | 50 | — | — |
| Natural rubber | 50 | — | — |
| EPDM rubber | — | 100 | 100 |
| Zn oleate | 2 | — | — |
| Fatty acid/fatty acid ester | — | 3 | 3 |
| ZnO | 5 | 5 | 5 |
| Carbon black N-550 | 50 | 60 | 100 |
| Naphth. mineral oil | — | 20 | 75 |
| Sulphur | — | 2 | — |
| Benzothiazyl-2-cyclohexyl-sulphenamide | 0.5 | — | — |
| Tetramethylthiuram-disulphide | 1.5 | — | — |
| Dicaprolactam disulphide | 2.5 | — | — |
| accelerator combination CMT | — | 5 | — |
| Triallyl cyanurate (70%) | — | — | 1 |
| Bis-(tertiary butyl-peroxy isopropyl)-benzene | — | — | 6 |

EXAMPLE OF PRACTICAL APPLICATION

The substances shown in Table 1 were mixed in an internal mixer in the conventional manner. Test mixtures prepared without additive (a), with the addition of 10%, by weight, of sulphur-Factice (b) and with the addition of 10%, by weight, of the product according to Example 3 (c), in each case based on the quantity of rubber, were tested to determine the properties indicated in Table 2.

TABLE 2

| | a | b | c |
|---|---|---|---|
| In test mixture 1: | | | |
| Speed of extrusion (cm/min) | 128 | 137 | 47 |
| Extrusion rate (g/min) | 93 | 96 | 105 |
| Heatstability at 100° C.: (%) deformation | | | |
| after 5 min | 9 | 8 | 4 |
| after 30 min | 11 | 9 | 5 |
| Vulcanization 10'/150° C.: hardness (ShA) | 64 | 63 | 64 |
| Tensile strength (MPa) | 17.3 | 16.0 | 16.0 |
| Elongation at break (%) | 340 | 350 | 350 |
| Compression set: 24 h/100° C. (%) | 16 | 29 | 16 |
| In test mixture 2: | | | |
| Speed of extrusion (cm/min) | 125 | 143 | 146 |
| Extrusion rate (g/min) | 103 | 114 | 115 |
| Heatstability at 100° C.: | | | |

TABLE 2-continued

|  | a | b | c |
|---|---|---|---|
| (%) deformation | | | |
| after 5 min | 9 | 8 | 4 |
| after 30 min | 13 | 10 | 8 |
| Vulcanization 10'/160° C.: hardness (ShA) | 67 | 65 | 65 |
| Tensile strength (MPa) | 10.3 | 9.1 | 9.1 |
| Elongation at break (%) | 270 | 280 | 330 |
| Compression set: 24 h/120° C. (%) | 53 | 53 | 47 |
| In test mixture 3: | | | |
| Speed of extrusion (cm/min) | 138 | 154 | 163 |
| Extrusion rate (g/min) | 84 | 94 | 99 |
| Heatstability 100° C.: | | | |
| (%) deformation | | | |
| after 5 min | 9 | 9 | 7 |
| after 30 min | 18 | 12 | 9 |
| Vulcanization 10'/170° C.: hardness (ShA) | 48 | 44 | 47 |
| tensile strength (MPa) | 9.6 | 6.1 | 7.4 |
| Elongation at break (%) | 460 | 670 | 450 |
| Compression set: | | | |
| 24 h/100° C. (%) | 11 | 24 | 9 |
| 14 h/150° C. (%) | 14 | 40 | 15 |

We claim:

1. A method of processing an elastomeric polymer comprising the steps of preparing and vulcanizing a mixture of said polymer and an effective amount of an active processing composition which comprises cross-linked epoxidized esters of at least dihydric alcohols and unsaturated fatty acids.

2. Method according to claim 1, wherein the cross-linked epoxidized esters are natural triglycerides of unsaturated fatty acids.

3. Method according to claim 1, wherein the epoxide content of the esters is from 1.5 to 15% by weight.

4. Method according to claim 1, wherein cross-linking is carried out using polycarboxylic acids, polyamines, polyhydroxyl compounds, polythiol compounds and compounds containing differing cross-linking groups selected from carboxyl, amino, hydroxyl and thiol.

5. Method according to claim 1, wherein cross-linking is carried out using dicarboxylic acids.

6. Method according to claim 1, wherein the epoxidized and subsequently cross-linked esters are added to the polymers in quantities of from 3 to 400% by weight, based on the pure polymer.

* * * * *